(12) United States Patent
Miles

(10) Patent No.: US 7,017,932 B1
(45) Date of Patent: Mar. 28, 2006

(54) HEEL GUARD FOR USE WITH MOTORCYCLES

(76) Inventor: Carl F. Miles, P.O. Box 1, Widsom, MT (US) 59761

( * ) Notice: Subject to any disclaimer, the term of this patent is extended or adjusted under 35 U.S.C. 154(b) by 32 days.

(21) Appl. No.: 10/669,857

(22) Filed: Sep. 24, 2003

Related U.S. Application Data

(63) Continuation-in-part of application No. 10/036,192, filed on Dec. 28, 2001, now Pat. No. 6,626,448.

(51) Int. Cl.
G05G 1/18 (2006.01)

(52) U.S. Cl. .................................... 280/291; 280/304.4

(58) Field of Classification Search ................ 280/291, 280/304.3, 304.4, 748; 180/90.6, 219; 296/75; 74/563, 564, 594.6
See application file for complete search history.

(56) References Cited

U.S. PATENT DOCUMENTS

| 3,756,623 | A | 9/1973 | Whittler |
| 4,023,821 | A | 5/1977 | Eiland |
| 4,451,057 | A | 5/1984 | Lawson |
| 4,728,121 | A | 3/1988 | Graves |
| 4,802,684 | A | 2/1989 | Bennett et al. |
| 4,852,900 | A | 8/1989 | Nahachewski |
| D395,024 | S | 6/1998 | Baratti |
| 6,179,313 | B1 | 1/2001 | Christensen |

*Primary Examiner*—Lesley D. Morris
*Assistant Examiner*—Matthew Luby
(74) *Attorney, Agent, or Firm*—Richard C. Conover

(57) ABSTRACT

A motorcycle exhaust pipe protector for use with a motorcycle having an exhaust pipe running adjacent a user's footrest. The protector includes an elongate rod which is shaped to have a bent fore portion bent toward the motorcycle, and a bent aft portion bent away from the motorcycle in a lateral direction substantially orthogonal to the fore-and-aft direction. The bent aft portion is positioned directly behind the footrest. Further, a bracket is provided for mounting the rod to the footrest at a position between the footrest and the motorcycle, and at an elevation above the footrest.

7 Claims, 6 Drawing Sheets

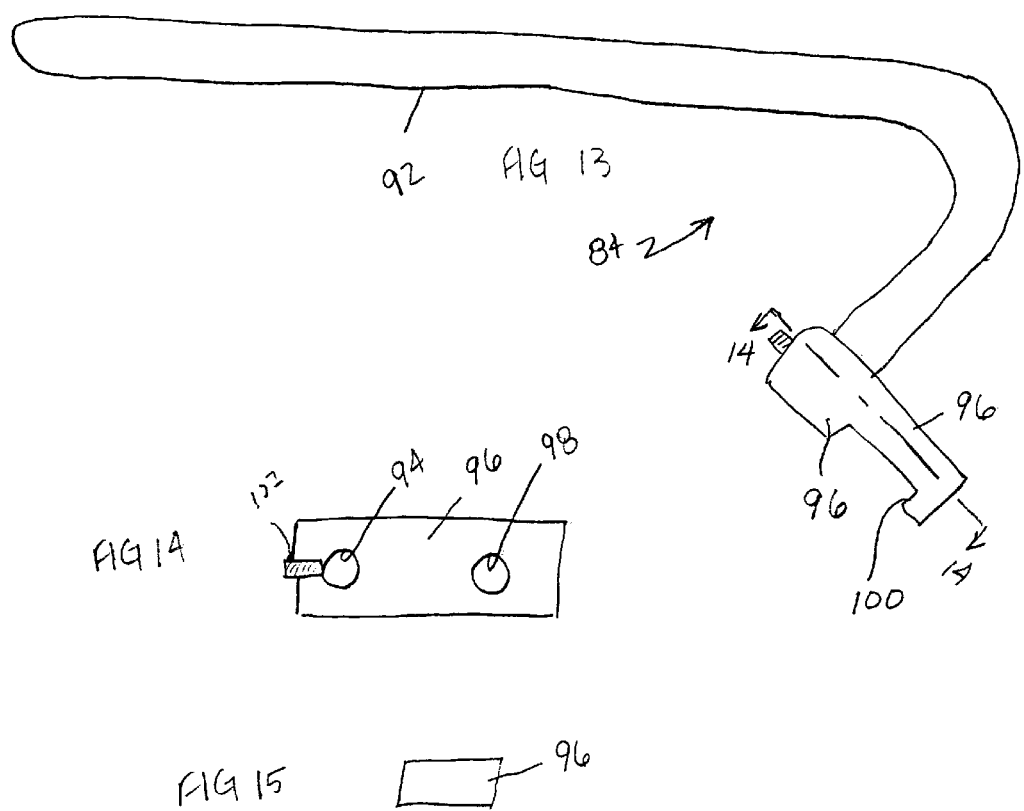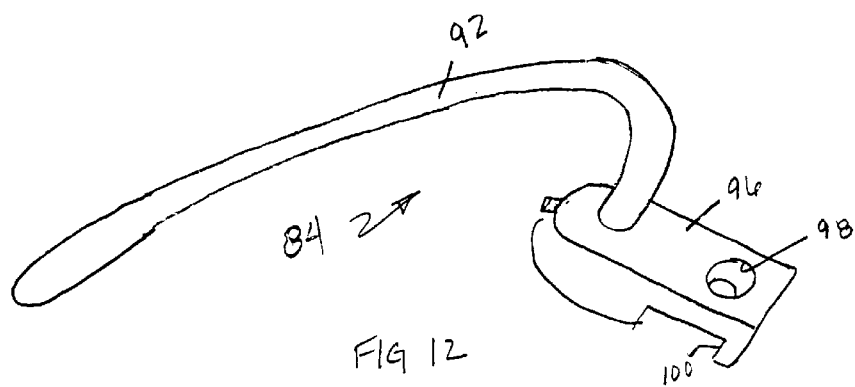

HEEL GUARD FOR USE WITH MOTORCYCLES

This application is a continuation-in-part of U.S. patent application Ser. No. 10/036,192, filed Dec. 28, 2001, now U.S. Pat. No. 6,626,448.

BACKGROUND OF THE INVENTION

The present invention relates to a device for preventing the foot of a motorcycle user from touching the motorcycle exhaust pipe.

Motorcycles having gasoline engines generally have the engines located at a forward position on the motorcycle underneath an operator's seat. The operator rests his feet on a footboard or foot peg positioned on each side of the motorcycle. The engine exhaust pipes extend along the side of the motorcycle to the rear thereof. Generally, an exhaust pipe extends along the inner side of the footboard or foot peg and then extends to the rear behind the footboard or foot peg. The exhaust pipe is commonly provided with a cover or a heat shield which extends longitudinally along with the pipe. As the exhaust pipe becomes hot, this heat shield also becomes hot.

When motorcycles are being driven by an operator, the operator places his feet either on footboards or foot pegs attached to the frame of the motorcycle in close proximity to the exhaust pipe. This exhaust pipe becomes extremely hot, and oftentimes an operator unintentionally positions his foot against this exhaust pipe causing the operator's clothing, footwear or even legs to be burned. Further, since the exhaust pipe generally runs beneath and behind the footboard or foot peg, a user may unintentionally slide his heel onto the hot exhaust pipe or shield, which again may cause burning.

The present invention relates to a device for protecting the foot of a user from engaging the exhaust pipe when using a motorcycle.

Heat shields for use with motorcycles are known. For example, U.S. Pat. No. 6,179,313 to Christensen shows a motorcycle exhaust pipe heat shield having a planar configuration and mounted between a footrest and the exhaust pipe. However, these shields are cumbersome to use and do not act to prevent the heel of the operator from engaging the exhaust pipe when using a motorcycle.

SUMMARY OF INVENTION

A motorcycle exhaust pipe protector for use with a motorcycle having an exhaust pipe running adjacent an operator's footrest. The protector includes an elongate rod which is shaped to have a bent fore portion bent toward the motorcycle, and a bent aft portion bent away from the motorcycle in a lateral direction substantially orthogonal to the fore-and-aft direction. The bent aft portion is positioned directly behind the footrest. Further, a bracket is provided for mounting the rod to the footrest at a position between the footrest and the motorcycle, and at an elevation above the footrest.

DESCRIPTION OF THE DRAWINGS

In order that the invention may be clearly understood and readily carried into effect, a preferred embodiment of the invention will now be described, by way of example only, with reference to the accompanying drawings wherein:

FIG. 12 is a perspective view of a fifth embodiment of a protector according to the present invention;

FIG. 13 is a front elevational view of the protector shown in FIG. 12;

FIG. 14 is a cross-sectional view taken along the line 14—14 in FIG. 13;

FIG. 15 is an end view of a mounting bracket used with the protector shown in FIG. 13.

DESCRIPTION OF A PREFERRED EMBODIMENT

Figure 1:
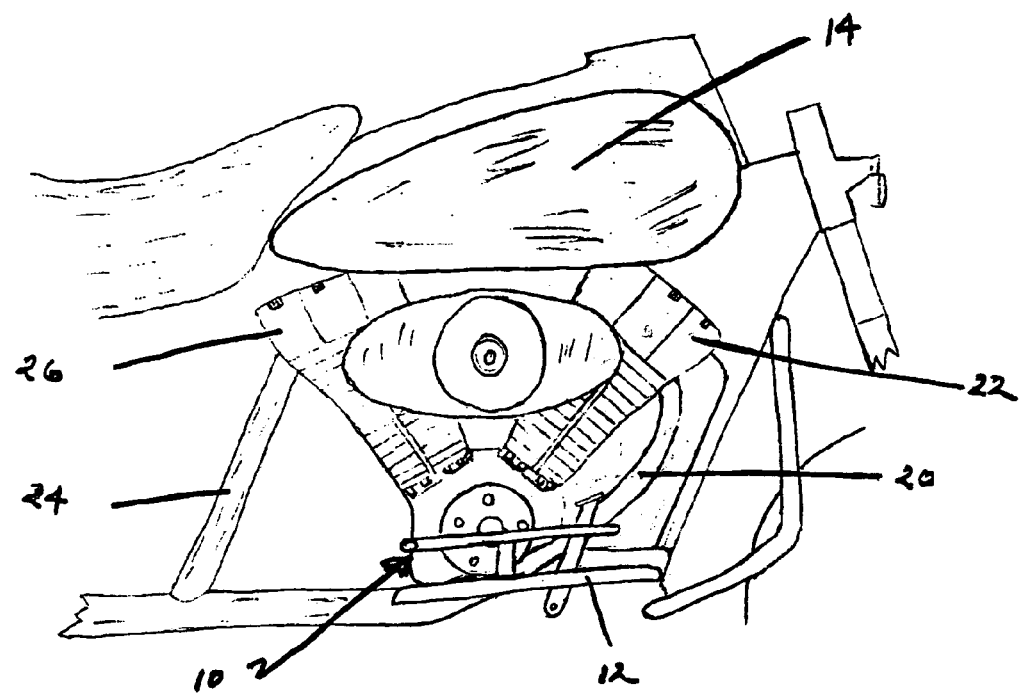
FIG. 1 is a right-side elevational view of a fragment of a conventional motorcycle with a heel guard according to the present invention installed.
Figure 2:
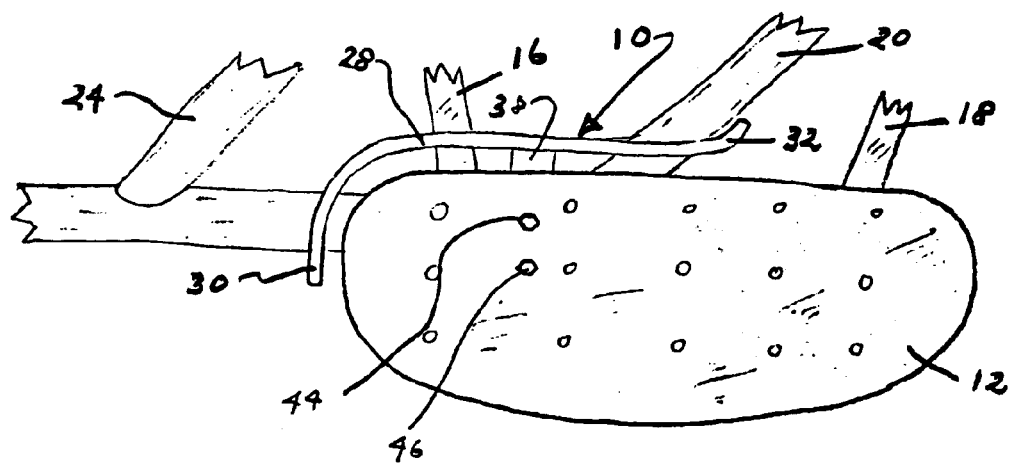
FIG. 2 is a top plan view of a footboard with the protector shown in FIG. 1 installed.

A first embodiment of the present invention 10 is shown in FIGS. 1–5. As shown in FIG. 1, the protector 10 is mounted to a footboard 12 which is mounted to a motorcycle 14. The footboard is mounted to the motorcycle 14 with support arms 16 and 18, as shown in FIG. 2. The motorcycle has a first exhaust pipe 20 exhausting one of the cylinders 22 of the motorcycle 14. Further, a second exhaust pipe 24 exhausts a second cylinder 26 of the motorcycle 14, as shown in FIG. 1. As shown in FIG. 2, the exhaust pipe 20 extends along the side and beneath the footboard 12 and extends rearwardly from the footboard 12 in an aft direction with respect to the motorcycle.

Figure 3:
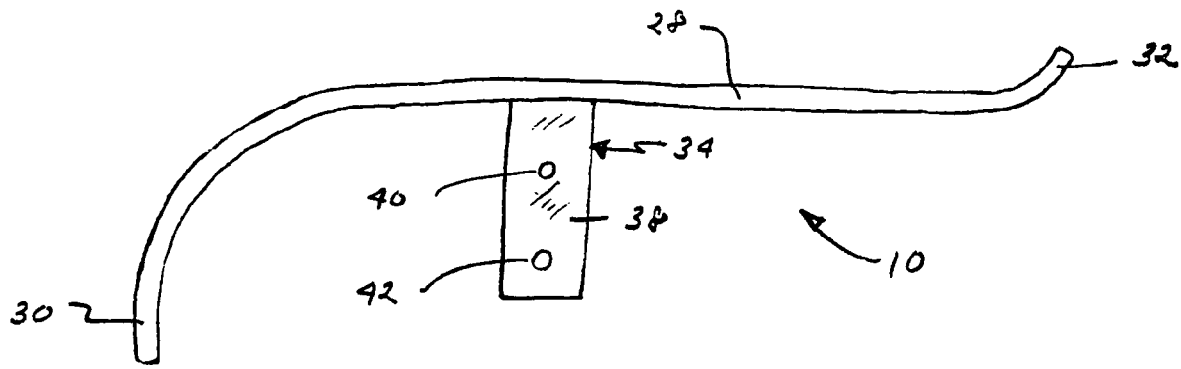
FIG. 3 is a top plan view of the protector shown in FIG. 1 removed from the footboard.
Figure 4:
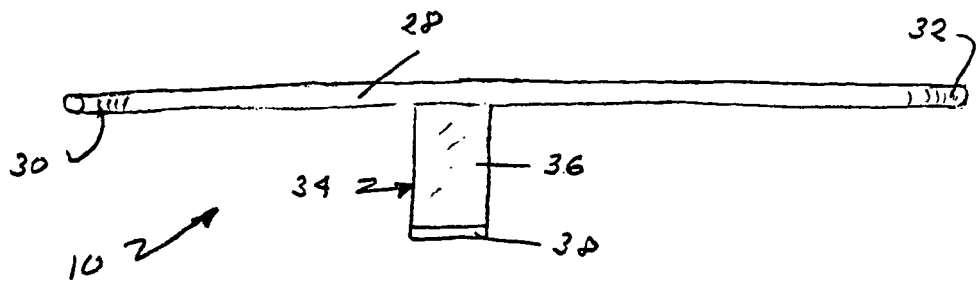
FIG. 4 is a front elevational view of the protector shown in FIG. 3.
Figure 5:
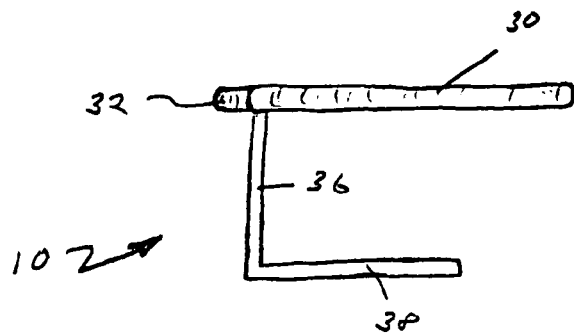
FIG. 5 is a left-side elevational view of the protector shown in FIG. 3.

The protector device is shown in detail in FIGS. 3–5. The protector includes a protector rod 28 which has a bent heel portion 30 which extends toward the motorcycle body, and further, a bent fore portion 32 which extends generally away from the motorcycle. An angle bracket 34 is provided having a pair of leg members 36 and 38 which are joined together along one edge in an orthogonal relation, as shown in FIG. 5. The free end of leg 36 is secured, as by welding, to the rod 28. The leg 38 is provided with a pair of bolt holes 40 and 42, as shown in FIG. 3. Bolts 44 and 46 are inserted in bolt holes 42 and 40, respectively. The bolts are inserted through holes (not shown) provided in footboard 12 and nuts are threaded on the bolts to secure the protector 10 to the footboard 12.

Figure 6:
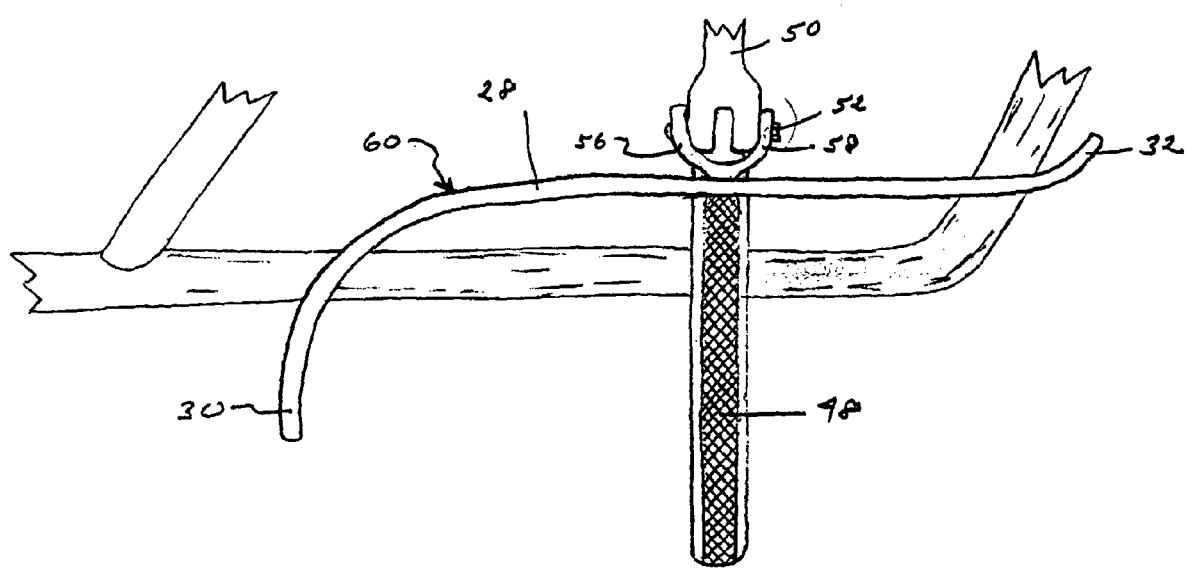
FIG. 6 is a top plan view of a protector according to the present invention mounted to a foot peg.
Figure 7:
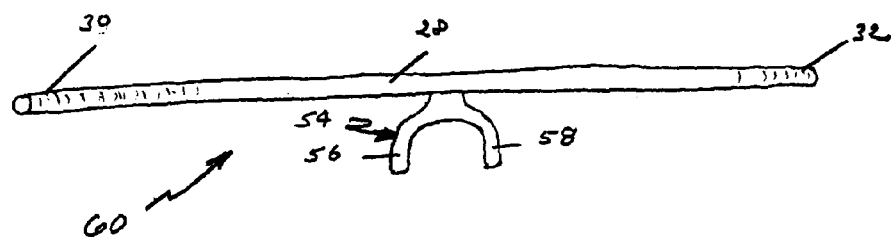
FIG. 7 is a front elevational view of the protector shown in FIG. 6.

A second embodiment 60 of a heel protector according to the present invention is shown in FIGS. 6 and 7. Elements common with the first embodiment are labeled with the same element numbers. This second embodiment 60 is used with a foot peg 48 which is attached to a motorcycle 14 with a support arm 50 in a conventional manner. The foot peg 48 is secured to the support arm 50 with a bolt 52. The second embodiment 60, separated from the foot peg 48, is shown in FIG. 7. The mounting bracket 54 has a pair of spaced-apart legs 56 and 58. A hole, not shown, extends through leg 56 adjacent a free end thereof, and a coaxially aligned hole (not shown) is provided in leg 58 adjacent a free end of leg 58. The protector 60 is mounted to the foot peg 48 by inserting the bolt 52 through leg 58 of the mounting bracket 54 and then through the support arm 50 and foot peg 48, as shown in FIG. 6, and then through the hole in the leg 56. A nut is threaded onto bolt 52 to hold the components together.

The mounting bracket 54 is welded to rod 28 at a position so that when the protector 60 is mounted to foot peg 48, the distance between heel portion 30 and foot peg 48 is sized to prevent a heel of a user from slipping down and between heel portion 30 and foot peg 48.

In using the present invention, a motorcycle user places his foot on the footboard 12 or foot peg 48 whichever is used with the particular motorcycle. The bent fore portion 32 of rod 28 guides the foot along rod 28 until the heel of the user abuts the bent heel portion 30. The rod 28 prevents the user's foot from resting in contact with exhaust pipe 20 and the heel portion 30 prevents the user's foot from sliding in the aft direction and onto the exhaust pipe 20 extending beneath the footboard 12 or foot peg 48.

Figure 8:
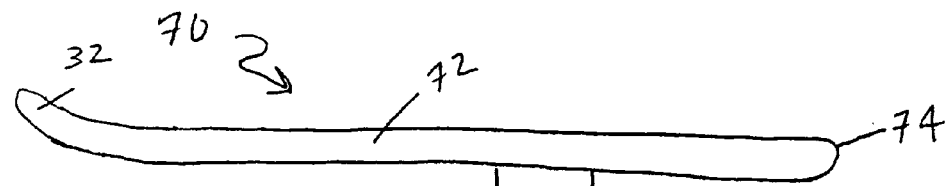
FIG. 8 is a top plan view of a third embodiment of a protector according to the present invention.
Figure 9:
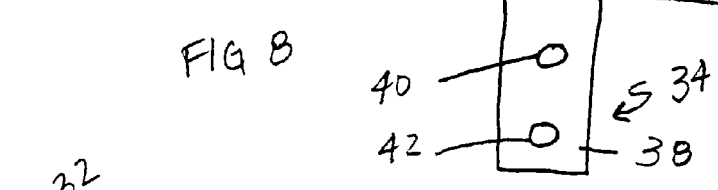
FIG. 9 is a front elevational view of the protector shown in FIG. 8.

A third embodiment 70 of a heel protector according to the present invention is shown in FIGS. 8 and 9. Elements common with the first embodiment are labeled with the same element numbers. This third embodiment includes a protector rod 72 that has a bent heel portion 74 which extends vertically downwardly toward the foot board 12. The third embodiment 70 of this heel protector is mounted to the foot board in a manner similar to the first embodiment.

Figure 10:
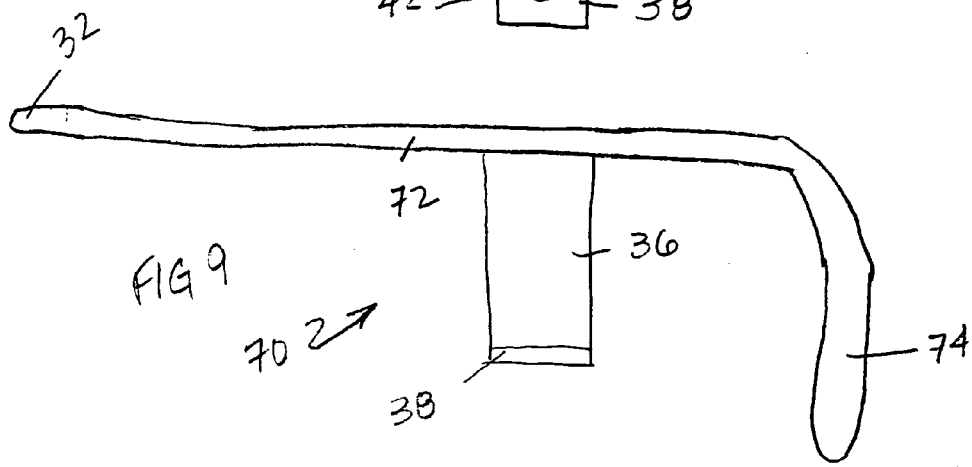
FIG. 10 is a top plan view of a fourth embodiment of a protector according to the present invention.
Figure 11:
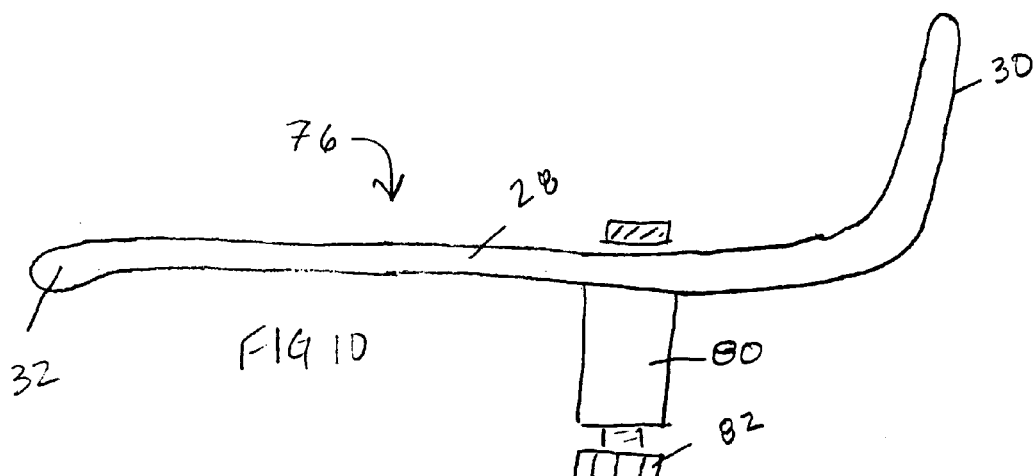
FIG. 11 is a is a front elevational view of the protector shown in FIG. 10.

A fourth embodiment 76 is shown in FIGS. 10 and 11. Elements common with the first embodiment are labeled with the same element numbers. This fourth embodiment 76 includes an arm 78 secured to the protector rod 28 in depending relation, as by welding. A tubular spacer 80 is secured to arm 78 in a transverse direction, as by welding. The footboard 12 is conventionally mounted to the frame of a motorcycle 14 with a bolt. In using the fourth embodiment of the present invention, this bolt is replaced with a bolt 82 which secures the fourth embodiment of the present invention as well as the footboard 12 to the frame of the motorcycle.

Figure 16:
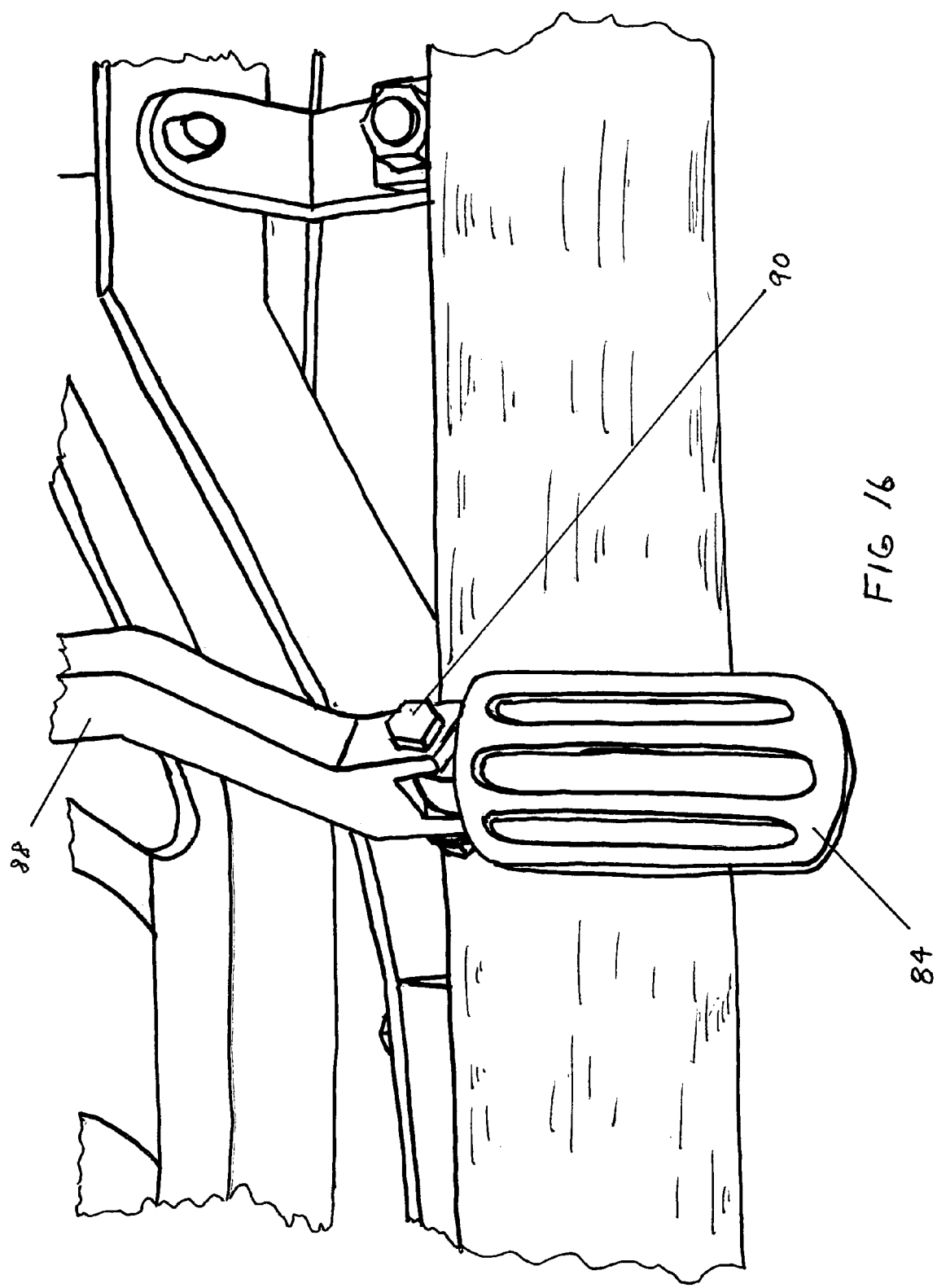
FIG. 16 is a partial view of a conventional foot peg mounted to a conventional foot peg mounting bracket.

A fifth embodiment 84 of the present invention is shown in FIGS. 12 and 13. This fifth embodiment is used with a foot peg attached to a motorcycle 14. FIG. 16 shows a conventional foot peg 84 mounted to a conventional foot peg mounting bracket 88 with a bolt 90. The foot peg mounting bracket 88 is mounted to the frame of the motorcycle 14 in a conventional manner. A protector rod 92 has an end inserted in a hole 94 provided in a bracket 96, as shown in FIGS. 13 and 14. The bracket 96 is further provided with a second bore 98 for receiving the bolt 90. Further, the bracket 96 includes a dado cut-out portion 100, as shown in FIGS. 12 and 13, which fits over a top edge 101 of the foot peg mounting bracket 88, as shown in FIG. 16. The bolt 90 is then used to secure the fifth embodiment of the present invention to the foot peg mounting bracket 88.

A set screw 102 is threadably received by a bore provided in bracket 96, as shown in FIG. 14. With set screw 102, the angular position of the protector rod 92 with respect to the bracket 96 can be secured at a selected position.

The footboard embodiments and the foot peg embodiments of the present invention can be used by a user of the motorcycle, either an operator or a passenger, depending on the type of footrest used. In all of the embodiments, the protector rod prevents a user's foot from resting in contact with an exhaust pipe.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

I claim:

1. A motorcycle and exhaust pipe protector for a user of a motorcycle comprising:
    a motorcycle which is movable in fore-and-aft directions;
    a user footrest mounted to the motorcycle and extending in a lateral direction away from the motorcycle;
    an engine exhaust pipe on said motorcycle extending adjacent the footrest and further extending in the aft direction behind the footrest;
    an elongate rod; and
    means for mounting the rod to the motorcycle at a position between the footrest and the motorcycle and at an elevation above the footrest;
    the rod positioned to extend longitudinally in the fore-and-aft direction.

2. A motorcycle and exhaust pipe protector for a user of a motorcycle comprising:
    a motorcycle which is movable in fore-and-aft directions;
    a user footrest mounted to the motorcycle and extending in a lateral direction away from the motorcycle;
    an engine exhaust pipe on said motorcycle extending adjacent the footrest and further extending in the aft direction behind the footrest;
    an elongate rod;
    a bracket for mounting the rod to the footrest at a position between the footrest and the motorcycle and at an elevation above the footrest;
    the rod positioned to extend longitudinally in the fore-and-aft direction;
    the rod having a bent aft portion, bent in a vertical direction substantially orthogonal to the fore-and-aft direction;
    the bent aft portion positioned directly aft of the footrest.

3. The protector according to claim 2 wherein the rod further includes a bent fore portion bent toward the motorcycle.

4. A motorcycle and exhaust pipe protector for a user of a motorcycle comprising:
    a motorcycle which is movable in fore-and-aft directions;
    the motorcycle having a frame;
    a user footboard extending in a lateral direction away from the motorcycle;
    a footboard bracket for mounting the footboard to the motorcycle;
    a bolt for mounting the footboard bracket to the frame of the motorcycle;
    an engine exhaust pipe on said motorcycle extending adjacent the footboard further extending in the aft direction behind the footrest;
    an elongate rod having a longitudinal axis;
    a bracket for mounting the rod to the frame of the motorcycle;

the bracket having a depending leg portion having one end joined to the elongate rod in depending relation and a tubular member mounted to a distal end of the leg portion and extending in a direction orthogonal to the longitudinal axis of the elongate rod;

the tubular member having an internal bore for receiving the bolt used for mounting the footboard bracket to the frame of the motorcycle;

the rod positioned to extend longitudinally in the fore-and-aft directions;

the rod having a bent aft portion bent away from the motorcycle in a lateral direction substantially orthogonal to the fore-and-aft direction; and the bent aft portion positioned directly aft of the footboard.

5. A protector according to claim 4 wherein the rod further includes a bent fore portion bent toward the motorcycle.

6. A motorcycle and exhaust pipe protector for a user of a motorcycle comprising:

a motorcycle which is movable in a fore-and-aft direction;

the motorcycle having a frame;

a user foot peg extending in a lateral direction away from the motorcycle;

a foot peg mounting bracket secured to the frame of the motorcycle;

a bolt for mounting the foot peg to the foot peg mounting bracket;

an engine exhaust pipe on said motorcycle extending adjacent the foot peg for extending in the aft direction behind the foot peg;

an elongate rod having a longitudinal axis;

a protector bracket for mounting the elongate rod to the foot peg bracket;

the protector bracket having a bore therethrough for receiving the bolt mounting the foot peg to the foot peg bracket and further having a second bore for receiving one end of the elongate rod;

the elongate rod positioned with a forward end located in the second bore;

the protector bracket further having a set screw for frictionally engaging the elongate rod to secure the elongate rod at a selected rotated position within the second hole;

the rod having a bent fore portion bent back on itself in a vertical direction and extending in the aft direction; and the elongate rod located at a position between the foot peg and the motorcycle, and at an elevation above the foot peg.

7. The protector according to claim 6 wherein the rod further includes a bent aft portion bent toward the motorcycle.

* * * * *